(12) United States Patent
Tseng

(10) Patent No.: US 6,553,915 B2
(45) Date of Patent: Apr. 29, 2003

(54) TRAFFIC SYSTEM AND METHOD

(76) Inventor: Hong-Li Tseng, 269 S. Beverly Dr., #339, Beverly Hills, CA (US) 90212

( * ) Notice: Subject to any disclaimer, the term of this patent is extended or adjusted under 35 U.S.C. 154(b) by 0 days.

(21) Appl. No.: 09/854,015

(22) Filed: May 10, 2001

(65) Prior Publication Data

US 2002/0166476 A1 Nov. 14, 2002

(51) Int. Cl.[7] .............................................. A63G 1/00
(52) U.S. Cl. ...................... 104/23.1; 104/23.2; 104/59; 104/73
(58) Field of Search ................. 104/23.1, 23.2, 104/59, 71, 72, 73, 27, 30, 31; 105/3, 8.1

(56) References Cited

U.S. PATENT DOCUMENTS

| | | | |
|---|---|---|---|
| 1,591,566 A | * 7/1926 | Schmidt et al. ............... 104/72 |
| 1,885,643 A | * 11/1932 | Thoerig et al. ............... 104/73 |
| 3,404,635 A | * 10/1968 | Bacon et al. ................. 104/71 |
| 3,958,524 A | * 5/1976 | Cantley et al. ............. 114/146 |
| 4,303,034 A | * 12/1981 | Tattersall ..................... 14/67 A |
| 4,360,350 A | * 11/1982 | Grover .......................... 440/88 |
| 4,429,867 A | * 2/1984 | Barber .......................... 272/32 |
| 5,176,082 A | * 1/1993 | Chun et al. ................... 104/28 |
| 5,522,742 A | * 6/1996 | Futaki et al. ................. 440/46 |
| 5,823,296 A | * 10/1998 | Iwamoto et al. ............. 186/49 |
| 6,105,905 A | * 8/2000 | Spence ........................ 246/127 |
| 6,170,403 B1 | * 1/2001 | Behringer .................... 104/59 |
| 6,336,419 B1 | * 1/2002 | Breivik ........................ 114/248 |

* cited by examiner

Primary Examiner—S. Joseph Morano
Assistant Examiner—Frantz F. Jules
(74) Attorney, Agent, or Firm—MacPherson Kwok Chen & Heid LLP

(57) ABSTRACT

A traffic system is disclosed to include a passageway defining a moving direction and a vehicle mounted in the passageway and running along the moving direction. In one instance, the passageway has two inner side walls and an inner bottom wall having a transverse cross-section formed into a continuous smooth surface. In further a instance, there is provided with a buoyant fluid stored in the passageway for generating a buoyancy while displaced by the vehicle. A traffic method is also provided to include steps of providing a vehicle, providing a medium for carrying thereon the vehicle moving therealong, and providing a buoyant medium for reducing a weight of the vehicle.

103 Claims, 6 Drawing Sheets

TRAFFIC SYSTEM AND METHOD

FIELD OF THE INVENTION

The present invention relates to a traffic system or a traffic method, and more particularly to those where the moving path is substantially fixed.

BACKGROUND OF THE INVENTION

There are many methods to interpret the human developing history. It is not too much exaggerated if we hold that it is closely related to how the traffic system or vehicle is developed. In brief:
1) Animal power: It is easily exhaustive no matter how many animals are involved in use. The endurance, power stability and power output are relatively limited;
2) Human power: This is limited to the diversification and/or function-multiplication of the bicycle or canoe or the like and has the same limitations as above described since broadly speaking, this is a kind of animal power;
3) Natural power: Artificial utensils, e.g. sailboat, glider, hot-air balloon, raft . . . etc., are driven to move by the possibly existent wind, tide or water potential difference in nature. It goes without saying that we cannot accurately control their power stability and power output and when they can be put into use; and
4) Electric/Mechanic power: Although vehicles powered by any one of the above three kinds of powers are improved in functions with the changing time, it is necessitated that they are limited by their inherent characters. Since the steam engine was invented by James Watt, trains, cars, motorcycles, containers, oil tankers, aircraft carriers, submarines, airfreighters, fighters, airplanes . . . not only all have a rigorously advanced performance but also can be powered to move in an extremely high speed. Since information about these is easily accessible, no further description relating thereto will be given here.

In the striving process for development of the human society, it is often moving to find how the pioneers always sticked to their dreams or ideals. Perhaps, most of them failed. Nevertheless, a few examples of success have successfully built this world of nearly satisfactory technological civilization. Among the above 4 categories, a new category was constructed by a new underlying idea. In eastern logic or philosophy, the human being is closely related to the nature and it is a great task to pursue a harmony therebetween. As such, it is strongly believed that a spectacular or revolutionary creation must originate from such deep but clear inspiration or philosophy. The Symphony No. 5 in C minor, i.e. the so called Fate Symphony composed by Beethoven was enlightened from the voice the landlord knocked the door, which is a good example for what we just mentioned.

The applicant was born at An-Ping Harbor, Tainan, Taiwan. In his childhood, the shock that a hand with a small force could push so big a harbored fishing boat still remains in his present mind. After grown to have the opportunity to get known to the fact that the Dead Sea or Salt Lake exhibits a greater buoyancy, the above shock becomes oscillated in his mind now and then. The present invention was suddenly somehow conceived. In sum, the present invention aims to power a buoyed-up vehicle by the power available on land in order to obtain a conveying medium being even faster or energy-conservative.

Specifically, a traffic system according to the present invention includes a passageway built on a land and defining a moving direction, a buoyant fluid contained in the passageway for generating a buoyancy while displaced, and a vehicle arranged to move in the passageway along the moving direction with the buoyancy from the buoyant fluid. We will compare how the general land vehicle and the present vehicle differ from each other while performing the work:
1) For the general land vehicle: the simplified force and work equations are as follows:

$$W = mV_1^2/2 + F_D*D + F_F \cdot D \quad (1)$$

$$F_D = C_D A \rho_1 V_1^2/2 \quad (2)$$

$$F_F = \mu m g \quad (3)$$

wherein W is the total work done by the vehicle, m is the mass of vehicle, $V_1$ is the speed of vehicle on the land, $F_D$ is the total drag force of vehicle in air including the frictional drag and the pressure drag, D is the displacement, $F_F$ is the frictional resistance of vehicle on land, $C_D$ is the coefficient of the total resistance, A is the span or the characteristic area of vehicle, $\rho_1$ is the air density, $\mu$ is the frictional coefficient, and g is the gravitational acceleration.
2) For the present vehicle: the simplified force and work equations are as follows:

$$W = mV_2^2/2 + F_{D1}*D + F_{D2}*D \quad (4)$$

$$F_{D1} = C_{D1} A_1 \rho_1 V_2^2/2 \quad (5)$$

$$F_{D2} = C_{D2} A_2 \rho_2 V_2^2/2 \quad (6)$$

Wherein W is the total work done by the vehicle, m is the mass of vehicle, $V_2$ is the speed of vehicle in the liquid, $F_{D1}$ is the total drag force of the part of vehicle in air including the frictional drag and the pressure drag, $F_{D2}$ is the total drag force of the part of vehicle in the liquid including the frictional drag and the pressure drag, D is the displacement, $C_{D1}$ is the coefficient of the total resistance of the part of vehicle exposed in air, $C_{D2}$ is the coefficient of the total resistance of the part of vehicle immersed in the liquid, $A_1$ is the span or the characteristic area of the part of vehicle exposed in air, $A_2$ is the span or the characteristic area of the part of vehicle immersed in the liquid, $\rho_1$ is the air density, and $\rho_2$ is the liquid density.

According to the above equations, we can design the desired characteristic shape of a specific vehicle.

It is therefore attempted by the applicant to provide a new style of vehicle as above-described.

SUMMARY OF THE INVENTION

An objective of the present invention is to provide a new style of vehicle.

It is further an object of the present invention to provide a new traffic method.

It is another object of the present invention to provide a vehicle system having a relatively low construction cost.

It is still an object of the present invention to provide a vehicle system having a low operation cost.

Specifically the essential concept of the present invention might be regarded as something like "to move a boat on the land." In other words, the present invention tries to take advantages of moving the boat for the vehicle on the land. A "boat" referred to herein is not limited to any specific kind of boat or ship. Any kind of boat or ship, e.g. an air-cushioning boat, which is appropriate to be mounted or powered in the present predetermined passageway is proper.

Certainly, for achieving the above-described objects, we must consider various variables and then adjust various parameters according to the above-referenced equations.

According to a first aspect of the present invention, a traffic system includes a passageway defining a moving direction, a buoyant fluid contained in the passageway for generating a buoyancy while displaced, and a vehicle arranged to move in the passageway along the moving direction with the buoyancy from the buoyant fluid.

Certainly, the passageway can be made of a material selected from a group consisting of glass, fiber-reinforced plastics, reinforced concrete, steel reinforced concrete and stainless steel. The buoyant fluid can be one selected from a group consisting of water, sea water, condensed sea water, water with an additive, sea water with an additive, and any one which can float thereon the vehicle.

Preferably the present system further includes a control agent for controlling a constituent of the buoyant fluid wherein said control agent controls a specific weight of the buoyant fluid. Such control agent can be condensed sea water having a specific weight ranging from 12 to 16 kN/M$^3$, or an additive for increasing the specific weight of the buoyant fluid.

Preferably in the present system, the vehicle further includes a specific weight detector for detecting the specific weight of the buoyant fluid. The present vehicle further includes a vessel for storing the control agent for releasing the control agent into the buoyant fluid when the detector detects that the buoyant fluid has a decreased specific weight.

Certainly the control agent can be a sterilizing agent or a fragant agent. The present vehicle can assume a shape of a flying boat or a railroad car. The vehicle can include a plurality of said railroad cars which can be used for carrying freight, e.g. containers. The present vehicle can further include a disturbing device for being optionally operated in the buoyant fluid for disturbing the buoyant fluid.

Preferably the present vehicle further includes a bearing mounting for mounting thereon a bearing array for guiding the vehicle to move in the passageway. The present passageway further includes a bearing contact band for contact with the bearing array. This contact band can be obtained by finishing a wall defining the passageway, or can be a contact piece secured to the wall defining the passageway.

Preferably the present vehicle further includes a rudder device for controlling the vehicle to move along the moving direction. The rudder device can include a rudder protruded into the buoyant fluid. The present vehicle can further include a propeller, which can be made of fiber reinforced plastics. The present vehicle can have a hollow housing in which a supplemental buoyant gas is stored wherein the supplemental buoyant gas can be one of helium and hydrogen. The present vehicle can include a control room provided with a propeller control switch, a broadcast system control switch, an air-conditioning control switch, a gate control switch, a control agent control switch, a control switch controlling measurement of a specific weight of the buoyant fluid, a disturbing device control switch and a rudder device control switch.

Preferably the present vehicle further includes a gate formed into a collapsible passage. Normally the present system further includes a station provided with a platform having one side thereof, which is parallel to the passageway, provided with a confining member for isolating the passageway. The present station can have a sliding door for passing freight/passenger through the confining member into/from the vehicle. The present confining member can be in a form of a balustrade. The present passageway can have a greater depth adjacent the station.

According to another aspect of the present invention, a traffic method includes steps of providing a vehicle, providing a medium for carrying thereon the vehicle moving therealong, and providing a buoyant medium for reducing a weight of the vehicle.

Normally the carrying medium is a passageway defining a moving direction. The buoyant medium is a buoyant fluid contained in said passageway for generating a buoyancy while displaced by the vehicle so that the vehicle moves in the passageway along the moving direction with the buoyancy from the buoyant fluid. Certainly the buoyant medium can include a buoyant gas for reducing a weight of the vehicle. The buoyant gas can be contained in a housing of the vehicle.

Normally the present method further includes a step of controlling a constituent of the buoyant medium, which can be performed by a control agent which can control a specific weight of the buoyant medium wherein the control agent can be an additive for increasing the specific weight of the buoyant fluid. Alternatively the control agent can be a sterilizing agent or a fragant agent.

Certainly the present method can further include a step of detecting a specific weight of the buoyant medium, which can be performed by a specific weight detector. Such vehicle can assume a shape of a flying boat or include a plurality of railroad cars. The present method can further include a step of disturbing the buoyant medium, which can be performed by a disturbing device.

Preferably the present method further include a supplemental guiding step for guiding the vehicle to move in the carrying medium, which can be performed by a bearing mounting for mounting thereon a bearing array. Such carrying medium can further include a bearing contact band for contact with the bearing array.

Preferably the present method further include a step of controlling a moving direction of the vehicle, which can be performed by a rudder device. Such vehicle can further include a propeller.

Preferably the present method further include a step of ensuring a safety during a period of getting on/off the vehicle, which can be performed by a gate formed into a collapsible passage. The present method can further include a step of facilitating an access to the vehicle, which can be performed by a station provided with a platform having one side thereof, which is parallel to the passageway, provided with a confining member for isolating the carrying medium. The present method can further include a step of breaking out the confining member, which can be performed by a sliding door for passing freight/passenger through the confining member into/from the vehicle.

According to further an aspect of the present invention, a traffic system include a passageway having two inner side walls and an inner bottom wall and defining a moving direction wherein the inner bottom wall has a transverse cross-section formed into a continuous smooth surface, and a vehicle contained in the passageway and running along the moving direction.

Certainly the passageway can be made of a material selected from a group consisting of glass, fiber-reinforced plastics, reinforced concrete, steel reinforced concrete and stainless steel. The present system may further include a buoyant fluid stored in the passageway for providing a buoyancy while displaced by the vehicle. The buoyant fluid can be one selected from a group consisting of water, sea water, condensed sea water, water with an additive, and sea water with an additive. The present system may further include a control agent for controlling a constituent of the buoyant fluid wherein the control agent can control a specific weight of the buoyant fluid. The control agent can be condensed sea water having a specific weight ranging from 12 to 16 kN/M³ or an additive for increasing the specific weight of the buoyant fluid. Such vehicle can include a specific weight detector for detecting the specific weight of the buoyant fluid, and can further include a vessel for storing the control agent for releasing the control agent into the buoyant fluid when the detector detects that the buoyant fluid has a decreased specific weight. Certainly the control agent can be a sterilizing agent or a fragant agent. If found necessary, the present vehicle can further include a disturbing device for being optionally operated in the buoyant fluid for disturbing the buoyant fluid.

Certainly the present vehicle can assume a shape of a flying boat or a railroad car, or be an air-cushioning boat. Certainly the present vehicle can include a plurality of railroad cars, at least one of which carries freight being, e.g. containers.

Certainly the present vehicle can further include a bearing mounting for mounting thereon a bearing array for guiding the vehicle to move in the passageway. The passageway can further include a bearing contact band for contact with the bearing array wherein the contact band can be obtained by finishing either one of the inner side walls of the passageway, or be a contact piece secured to either one of the inner side walls of the passageway.

Preferably the present vehicle further includes a rudder device for controlling the vehicle to move along the moving direction, which can further include a rudder protruded into the buoyant fluid. Such vehicle can further include a propeller, and can be made of fiber reinforced plastics.

Certainly the present vehicle can have a hollow housing in which a supplemental buoyant gas is stored wherein said supplemental buoyant gas can be one of helium and hydrogen.

Normally such vehicle can further include a control room provided with a propeller control switch, a broadcast system control switch, an air-conditioning control switch, a gate control switch, a control agent control switch, a control switch controlling measurement of a specific weight of the buoyant fluid, a disturbing device control switch and a rudder device control switch. Such vehicle can further include a gate formed into a collapsible passage. Normally the present system further include a station provided with a platform having one side thereof, which is parallel to the passageway, provided with a confining member for isolating the passageway. Such station can have a sliding door for passing freight/passenger through the confining member into/from the vehicle. Such confining member can be in a form of a balustrade. The passageway can have a greater depth adjacent the station.

The present invention may best be understood through the following description with reference to the accompanying drawings, in which:

DETAILED DESCRIPTION OF THE PREFERRED EMBODIMENT

Figure 1:
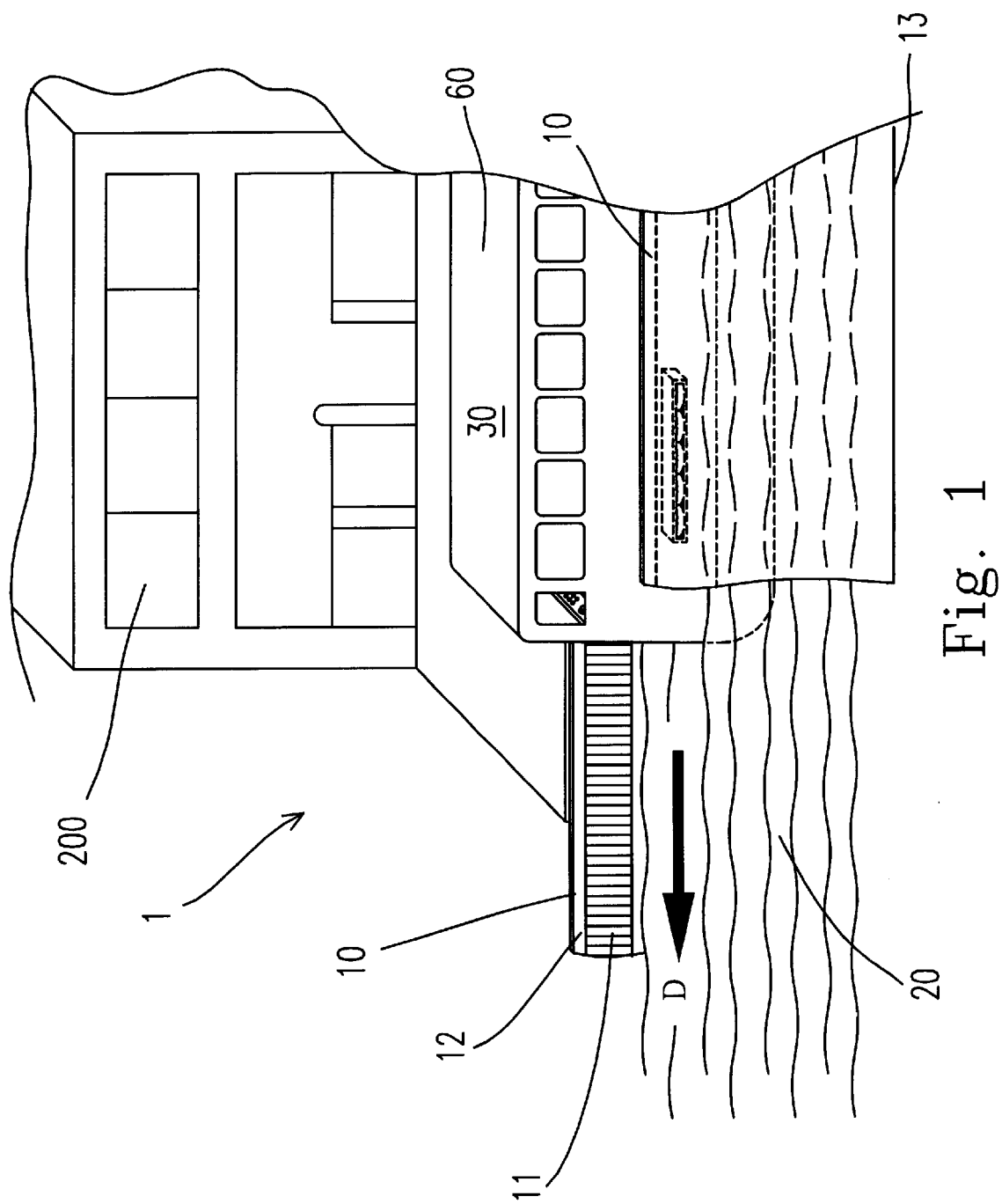
FIG. 1 is a schematic view showing a traffic system according to the present invention.
Figure 2:
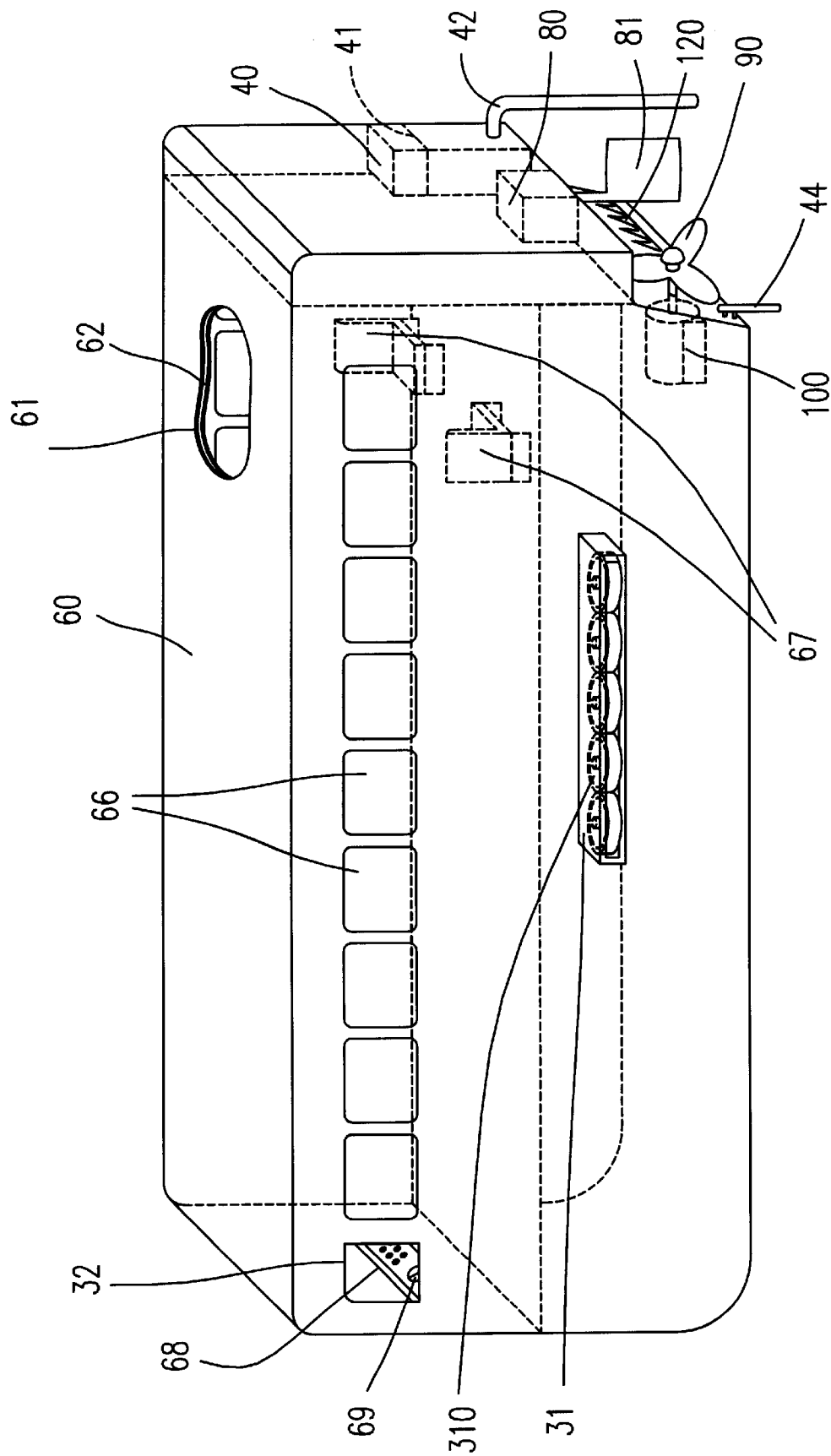
FIG. 2 is a schematic view showing a preferred embodiment of a vehicle for use in a traffic system according to the present invention.

Referring now to FIGS. 1 & 2, a traffic system 1 according to the present invention includes a passageway 10 defining a moving direction D, a buoyant fluid 20 contained in passageway 10 for generating a buoyancy while displaced, and a vehicle 30 arranged to move in passageway 10 along moving direction D with the buoyancy from buoyant fluid 20. Passageway 10 can be made of a material selected from a group consisting of glass, fiber-reinforced plastics, reinforced concrete, steel reinforced concrete and stainless steel.

Buoyant fluid 20 can be one selected from a group consisting of water, sea water, condensed sea water, water with an additive, sea water with an additive or any kind of liquid which can provide the buoyancy for vehicle 30. According to the Archimedes' principle, the greater the density of the liquid is, the larger the buoyancy provided by the displaced liquid of a specific volume. What we are taught by this principle is that a smaller draft for the vehicle is possible if a buoyant fluid of a higher density is involved in. The present system can further include a control agent 41 for controlling a constituent of buoyant fluid 20. Control agent 41 can be used to control a specific weight of buoyant fluid 20. Such control agent 41 can be condensed sea water having a specific weight ranging from 12 to 16 kN/M³, or any kind of additive for increasing the specific weight of buoyant fluid 20. Vehicle 30 can further include a specific weight detector 50 for detecting the specific weight of buoyant fluid 20. Vehicle 30 further includes a vessel 40 for storing control agent 41 to be released through a discharging tube 42 into buoyant fluid 20 to adjust the specific weight of buoyant fluid 20 when detector 50 detects that buoyant fluid 20 has a decreased specific weight. Certainly, control agent 41 can be purely a fragant agent or a sterilizing agent, e.g. copper sulfate, manganese peroxide, potassium hypochlorate, sodium hypochlorate, ozone, other hypochlorates . . . etc.

Figure 3:
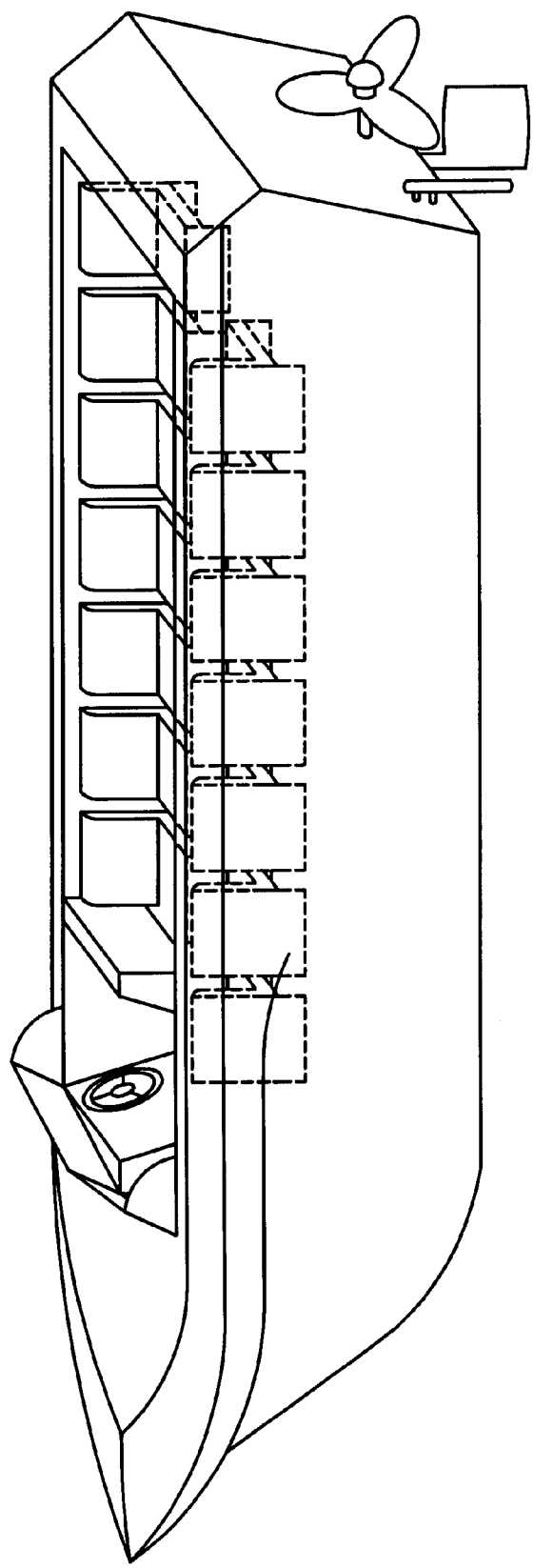
FIG. 3 is a schematic view showing further a preferred embodiment of a vehicle for use in a traffic system according to the present invention.
Figure 4:
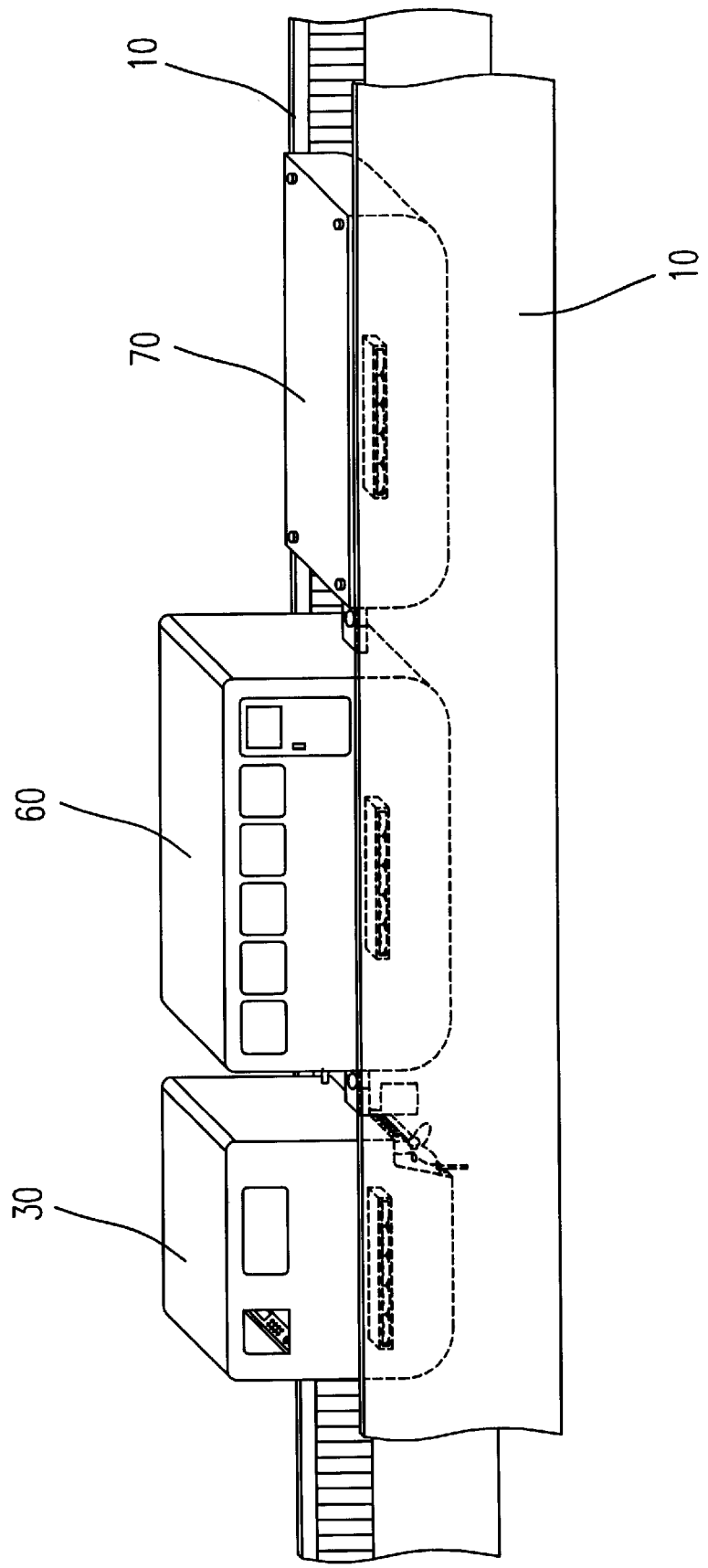
FIG. 4 is a schematic view showing a further preferred embodiment of a vehicle for use in a traffic system according to the present invention.
Figure 5:
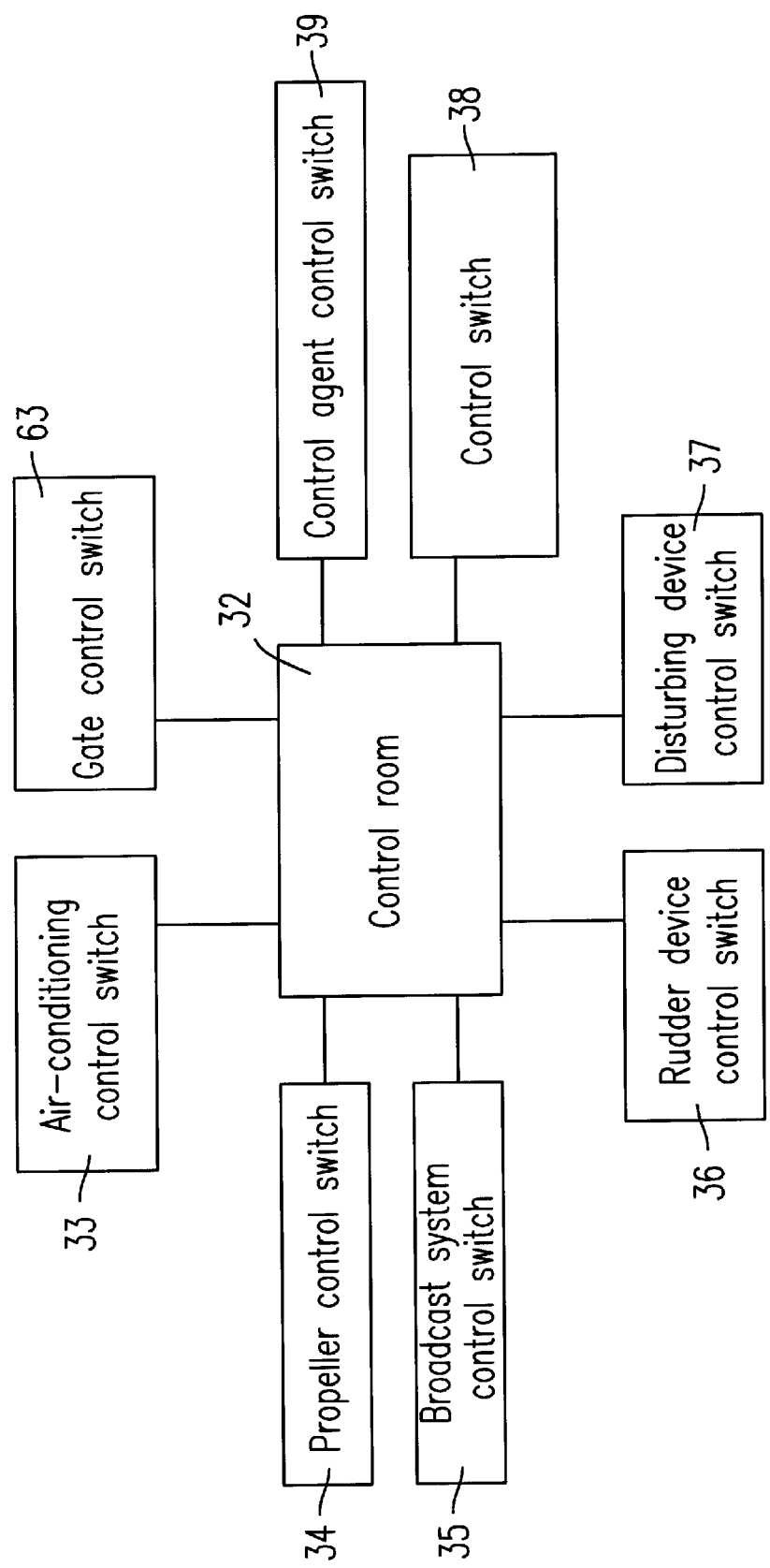
FIG. 5 is a schematic control block diagram showing a preferred embodiment of a control room of a traffic system according to the present invention.
Figure 6:
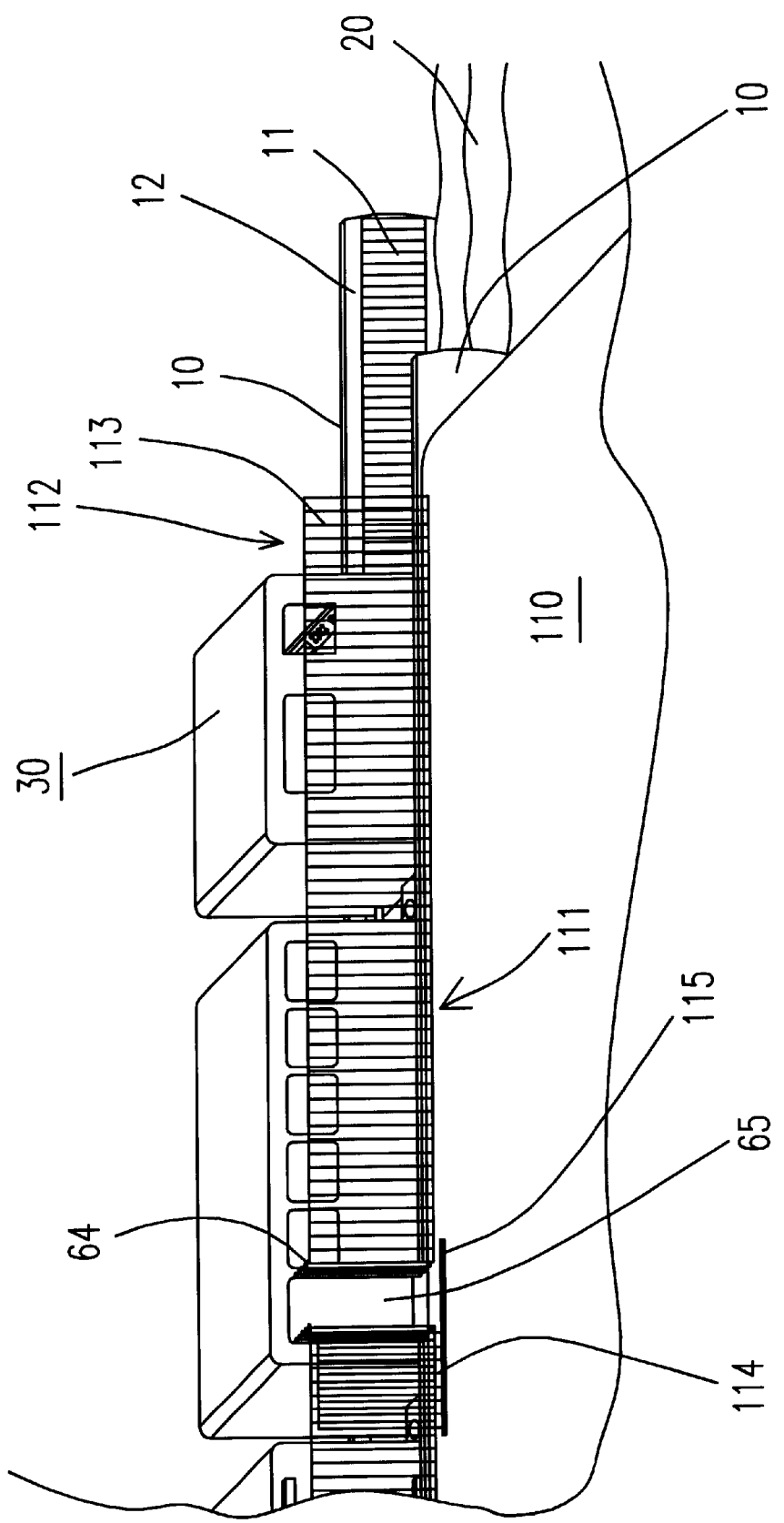
FIG. 6 is a schematic view showing a preferred embodiment of a station for use with a traffic system according to the present invention.

Vehicle 30 can assume a shape of a flying boat, as shown in FIG. 3 or a shape of a railroad car, as shown in FIG. 2. Certainly, vehicle 30 can include a plurality of railroad cars 60, as shown in FIG. 4, at least one of which 70 can be used to carry freight, e.g. a container.

Vehicle 30 can further include a disturbing device 120 for optionally being operated in buoyant fluid 20 for disturbing buoyant fluid 20 in order to minimize the chance of producing bad odor by the anaerobic microorganism. Vehicle 30 can further include a bearing mounting 31 for mounting thereon a bearing array 310 for guiding vehicle 30 to move in passageway 10. Passageway 10 further includes a bearing contact band 11 for contact with bearing array 310. Certainly, contact band 11 can be obtained by finishing an inner wall 12 defining passageway 10, or a contact piece secured to inner wall 12 defining passageway 10.

Imaginably, vehicle 30 can further include a rudder device 80 for controlling vehicle 30 to move along moving direction D. Rudder device 80 can include a rudder 81 protruded into buoyant fluid 20. Vehicle 30 can further include a propeller 90 driven to rotate by a motor 100 or other power medium. According to the concept of the present invention, in order to lighten the effective weight of vehicle 30, vehicle 30 can be made of fiber reinforced plastics. If appropriate or permitted, vehicle 30 can have a housing 61 being in the form of a hollow wall 62 in which a supplemental buoyant gas is stored wherein the supplemental buoyant gas can be helium or hydrogen.

Vehicle 30 includes a control room 32 provided with a propeller control switch 34, a broadcast system control switch 35, an air-conditioning control switch 33, a gate control switch 63, a control agent control switch 39, a control switch 38 controlling measurement of the specific weight of buoyant fluid 20, a disturbing device control switch 37 and a rudder device control switch 36. Vehicle 30 further includes a gate 64 formed into a collapsible passage 65, and also windows 66, a meter panel 68, kinds of meters 69 . . .

It is quite natural for the present system to further include a station 200 provided with a platform 110 having one side thereof 111, which is parallel to passageway 10, provided with a confining member 112 for isolating people and/or thing from passageway 10. Confining member 112 can be in a form of a balustrade 113. Station 200 can be provided with a sliding door 114 slidably mounted on a rail 115 for desiredly passing freight/passenger through confining member 112 into/from vehicle 30 in response to the open/close of gate 64 of vehicle 30. Certainly, if desired, passageway 10 can have a greater depth adjacent station 200 since a vehicle at a stop has a greater draft.

According to the methodology derivable from what are shown in FIGS. 1–6, we can describe a traffic method according to the present invention to include steps of providing a vehicle 30, providing a medium 10 for carrying thereon vehicle 30 moving therealong, and providing a buoyant medium 20 for reducing a weight of vehicle 30 to facilitate the movement of vehicle 30 in carrying medium 10.

As described in the preceding embodiment, carrying medium 10 can be a passageway 10 defining a moving direction D for vehicle 30. Buoyant medium 20 can be a buoyant fluid contained in passageway 10 for generating a buoyancy while displaced by vehicle 30 so that vehicle 30 moves in passageway 10 along moving direction D with the buoyancy from buoyant fluid 20. Buoyant medium 20 can include a buoyant gas, e.g. helium or hydrogen for reducing the weight of vehicle 30. The buoyant gas can be contained in hollow wall 62 of housing 61 of vehicle 30.

The present method can further include a step of controlling the constituent of buoyant medium 20 for keeping buoyant medium 20 always in a normal state for operation, which can be performed by a control agent 41 for controlling the specific weight of buoyant medium 20. Control agent 41 can be a sterilizing agent, a fragant agent or an additive for increasing the specific weight of buoyant fluid 20. For facilitating such control, the present method further includes a step of detecting a specific weight of buoyant medium 20, which is performed by a specific weight detector 50.

As above-mentioned, the present vehicle 30 can assume a shape of a flying boat, or a railroad train, or any desired shape, e.g. one having a car-like upper part and a boat-like lower part. Certainly vehicle 30 can be an integral body or one including a plurality of railroad cars 60, 70. It is also interesting and applicable to construct a rapid transit system according to the present concept. In order to inhibit the generation of the anaerobic microorganism, the present method further includes a step of disturbing buoyant medium 20, which can be performed by a disturbing device 120.

Preferably the present method further include a supplemental guiding step for guiding vehicle 30 to smoothly move in carrying medium 10, which can be performed by a bearing mounting 31 for mounting thereon a bearing array 310. For substantiating such supplemental guiding step, carrying medium 10 further includes a bearing contact band 11 for smooth contact with bearing array 310.

Normally the present method further includes a step of controlling a moving direction of vehicle 30, which can be performed by a rudder device 80. As is known, a vehicle 30 in a liquid is often driven to move by a propeller 90. In order to safely guide the passenger to get on/off vehicle 30, the present method further includes a safety-ensuring step, which can be performed by a gate 64 formed into a collapsible passage, e.g. a bridge similar to that used in the airport.

It is quite imaginable that the present method further includes a step of facilitating an access to vehicle 30, which can be performed by a station 200 provided with a platform 110 having one side thereof 111, which is parallel to passageway 10, provided with a confining member 112 for isolating passenger/freight from carrying medium 10. It would be desirable that the present method further includes a step of breaking out confining member 112, which can be performed by a sliding door 114 for passing freight/passenger through confining member 112 into/from vehicle 30 in response to open/close of gate 64 of vehicle 30.

Let us try to interpret the present invention differently. A traffic system according to the present invention includes a passageway 10 having two inner side walls 12 and an inner bottom wall 13 and defining a moving direction D wherein inner bottom wall 13 has a transverse cross-section formed into a continuous smooth surface, and a vehicle 30 contained in passageway 10 and running along moving direction D.

Passageway 10 can be made of a material selected from a group consisting of glass, fiber-reinforced plastics, reinforced concrete, steel reinforced concrete and stainless steel. What is different from the first embodiment is that under the current concept, passageway 10 need not be provided with a buoyant fluid. Such embodiment can be implemented by a special vehicle, e.g. an air-cushioning boat.

It goes without saying that the present system can further include a buoyant fluid 20 stored in passageway 10 for providing a buoyancy while displaced by vehicle 30. As mentioned previously, buoyant fluid 20 can be one selected from a group consisting of water, sea water, condensed sea water, water with an additive, sea water with an additive or any other liquid which can provide a proper buoyancy for vehicle 30. The present A system can further include a control agent 41 for controlling a constituent of buoyant fluid 20. Control agent 41 can be used to control a specific weight of buoyant fluid 20 and can be condensed sea water having a specific weight ranging from 12 to 16 kN/$M^3$ or an additive for increasing the specific weight of buoyant fluid 20. To the latest effect, vehicle 30 can include a specific weight detector 50 for detecting the specific weight of buoyant fluid 20. To this end, vehicle 30 can further include a vessel 40 for storing control agent 41 for releasing control agent 41 into buoyant fluid 20 when detector 50 detects that buoyant fluid 20 has a decreased specific weight. If buoyant fluid 20 does not exist much microorganism, control agent 41 can be a sterilizing agent or a fragant agent. If there is anaerobic microorganism in passageway 10 to be treated, vehicle 30 can further include a disturbing device 120 for being optionally operated in buoyant fluid 20 for disturbing buoyant fluid 20. If passageway 10 is provided with buoyant fluid 20, vehicle 30 can assume a shape of a flying boat or a shape of a railroad train including a plurality of railroad cars 60, 70, at least one of which can carry freight, e.g. containers.

Imaginably, vehicle 31 can further include a bearing mounting 31 for mounting thereon a bearing array 310 for guiding vehicle 30 to move in passageway 10. To this end, passageway 10 can further include a bearing contact band 11 for smooth contact with bearing array 310. Contact band 11 can be obtained by finishing either one of inner side walls 12 of passageway 10, or be a smooth contact piece secured to either one of inner side walls 12 of passageway 10. Vehicle 30 can further include a rudder device 80 for controlling vehicle 30 to move along a moving direction D. If passageway 10 is provided with buoyant fluid 20, rudder device 80 can include a rudder 81 protruded into buoyant fluid 20. Certainly vehicle 30 can further include a propeller 90 for driving vehicle 30. It goes without saying that other driving medium, e.g. a duct injecting a stream of high pressure can optionally be adopted.

To reduce the weight, vehicle 30 can be made of fiber reinforced plastics. If necessary, vehicle 30 can have a housing 61 having a hollow wall 62 in which a supplemental buoyant gas is stored wherein the supplemental buoyant gas can be helium or hydrogen.

If passageway 10 is provided with a buoyant fluid 20 for generating a buoyancy, vehicle 30 can include a control room 32 provided with a propeller control switch 34, a broadcast system control switch 35, an air-conditioning control switch 33, a gate control switch 63, a control agent control switch 39, a control switch 38 controlling measurement of a specific weight of buoyant fluid 20, a disturbing device control switch 37 and a rudder device control switch 36. Such vehicle 30 can further include a gate formed into a collapsible passage 65. It is reasonable that the present system further include a station 200 provided with a platform 110 having one side thereof 111, which is parallel to passageway 10, provided with a confining member 112 for isolating passenger/freight from passageway 10. Confining member 112 can be in a form of a balustrade. Station 200 should have a sliding door 114 for passing freight/passenger through confining member 112 into/from vehicle 30 in response to the gate 64 of vehicle 30. If necessary, passageway 10 can have a greater depth adjacent station 200.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A traffic system for conveying freight/passengers comprising:
    a passageway defining a moving direction;
    a buoyant fluid contained in said passageway for generating a buoyancy while displaced;
    at least two connected vehicle bodies arranged to move in said passageway along said moving direction with said buoyancy from said buoyant fluid; and
    a control agent for controlling a constituent of said buoyant fluid.

2. A system according to claim 1 wherein said passageway is made of a material selected from a group consisting of glass, fiber-reinforced plastics, reinforced concrete, steel reinforced concrete and stainless steel.

3. A system according to claim 1 wherein said buoyant fluid is one selected from a group consisting of water, sea water, condensed sea water, water with an additive, and sea water with an additive.

4. A system according to claim 1, wherein said control agent controls a specific weight of said buoyant fluid.

5. A system according to claim 4 wherein said control agent is condensed sea water having a specific weight ranging from 12 to 16 $kN/M^3$.

6. A system according to claim 4 wherein said control agent is an additive for increasing said specific weight of said buoyant fluid.

7. A system according to claim 6 wherein said at least two connected vehicle bodies includes a specific weight detector for detecting said specific weight of said buoyant fluid.

8. A system according to claim 7 wherein said vehicle further includes a vessel for storing said control agent for releasing said control agent into said buoyant fluid when said detector detects that said buoyant fluid has a decreased specific weight.

9. A system according to claim 1 wherein said control agent is a sterilizing agent.

10. A system according to claim 1 wherein said control agent is a fragrant agent.

11. A system according to claim 1 wherein said at least two connected vehicle bodies assumes a shape of a flying boat.

12. A system according to claim 1 wherein said at least two connected vehicle bodies assumes a shape of a railroad car.

13. A system according to claim 12 wherein said at least two connected vehicle bodies includes a plurality of said railroad cars.

14. A system according to claim 13 wherein said railroad cars are used for carrying freight.

15. A system according to claim 14 wherein said railroad cars are used for carrying containers.

16. A system according to claim 1 wherein said at least two connected vehicle bodies further includes a disturbing device for being optionally operated in said buoyant fluid for disturbing said buoyant fluid.

17. A system according to claim 1 wherein said at least two connected vehicle bodies further includes a bearing mounting for mounting thereon a bearing array for guiding said vehicle to move in said passageway.

18. A system according to claim 17 wherein said passageway further includes a bearing contact band for contact with said bearing array.

19. A system according to claim 18 wherein said contact band is obtained by finishing a wall defining said passageway.

20. A system according to claim 18 wherein said contact band is a contact piece secured to a wall defining said passageway.

21. A system according to claim 1 wherein said at least two connected vehicle bodies further includes a rudder device for controlling said vehicle to move along said moving direction.

22. A system according to claim 21 said rudder device includes a rudder protruded into said buoyant fluid.

23. A system according to claim 1 wherein said at least two connected vehicle bodies further includes a propeller.

24. A system according to claim 1 wherein said at least two connected vehicle bodies is made of fiber reinforced plastics.

25. A system according to claim 1 wherein said at least two connected vehicle bodies has a hollow housing in which a supplemental buoyant gas is stored.

26. A system according to claim 25 wherein said supplemental buoyant gas is one of helium and hydrogen.

27. A system according to claim 1 wherein said at least two connected vehicle bodies includes a control room provided with a propeller control switch, a broadcast system control switch, an air-conditioning control switch, a gate control switch, a control agent control switch, a control switch controlling measurement of a specific weight of said buoyant fluid, a disturbing device control switch and a rudder device control switch.

28. A system according to claim 1 wherein said at least two connected vehicle bodies further includes a gate formed into a collapsible passage.

29. A system according to claim 1, further comprising a station provided with a platform having one side thereof, which is parallel to said passageway, provided with a confining member for isolating said passageway.

30. A system according to claim 29 wherein said station has a sliding door for passing freight/passenger through said confining member into/from said at least two connected vehicle bodies.

31. A system according to claim 29 wherein said confining member is in a form of a balustrade.

32. A system according to claim 29 wherein said passageway has a greater depth adjacent said station.

33. A traffic method for conveying freight/passengers comprising steps of:
   providing at least two connected vehicle bodies;
   providing a medium for carrying thereon said at least two connected vehicle bodies moving therealong;
   providing a buoyant medium for reducing a weight of said vehicle; and
   controlling a constituent of said buoyant medium.

34. A method according to claim 33 wherein said carrying medium is a passageway defining a moving direction.

35. A method according to claim 33 wherein said buoyant medium is a buoyant fluid contained in said passageway for generating a buoyancy while displaced by said at least two connected vehicle bodies so that said at least two connected vehicle bodies moves in said passageway along said moving direction with said buoyancy from said buoyant fluid.

36. A method according to claim 33 wherein said buoyant medium includes a buoyant gas for reducing a weight of said at least two connected vehicle bodies.

37. A method according to claim 36 wherein said buoyant gas is contained in a housing of said at least two connected vehicle bodies.

38. A method according to claim 33 wherein said controlling step is performed by a control agent.

39. A method according to claim 38 wherein said control agent controls a specific weight of said buoyant medium.

40. A method according to claim 39 wherein said control agent is an additive for increasing said specific weight of said buoyant fluid.

41. A method according to claim 38 wherein said control agent is a sterilizing agent.

42. A method according to claim 38 said control agent is a fragrant agent.

43. A method according to claim 33 comprising a step of detecting a specific weight of said buoyant medium.

44. A method according to claim 43 wherein said detecting step is performed by a specific weight detector.

45. A method according to claim 33 wherein said at least two connected vehicle bodies assumes a shape of a flying boat.

46. A method according to claim 33 wherein said at least two connected vehicle bodies includes a plurality of railroad cars.

47. A method according to claim 33 further including a step of disturbing said buoyant medium.

48. A method according to claim 47 wherein said disturbing step is performed by a disturbing device.

49. A method according to claim 33 further comprising a supplemental guiding step for guiding said at least two connected vehicle bodies to move in said carrying medium.

50. A method according to claim 49 wherein said guiding step is performed by a bearing mounting for mounting thereon a bearing array.

51. A method according to claim 50 wherein said carrying medium further includes a bearing contact band for contact with said bearing array.

52. A method according to claim 33, further comprising a step of controlling a moving direction of said at least two connected vehicle bodies.

53. A method according to claim 52 wherein said controlling step is performed by a rudder device.

54. A method according to claim 53 wherein said at least two connected vehicle bodies further includes a propeller.

55. A method according to claim 33 further comprising a step of ensuring a safety during a period of getting on/off said at least two connected vehicle bodies.

56. A method according to claim 55 wherein said ensuring step is performed by a gate formed into a collapsible passage.

57. A method according to claim 33, further comprising a step of facilitating an access to said at least two connected vehicle bodies.

58. A method according to claim 57 wherein said facilitating step is performed by a station provided with a platform having one side thereof, which is parallel to said passageway, provided with a confining member for isolating said carrying medium.

59. A method according to claim 58 further comprising a step of breaking out said confining member.

60. A method according to claim 59 wherein said breaking out step is performed by a sliding door for passing freight/passenger through said confining member into/from said at least two connected vehicle bodies.

61. A traffic system for conveying freight/passengers comprising:
   a passageway having two inner side walls and an inner bottom wall and defining a moving direction wherein said inner bottom wall has a transverse cross-section formed into a continuous smooth surface;
   at least two connected vehicle bodies contained in said passageway and running along said moving direction;
   a buoyant fluid stored in said passageway for providing a buoyancy while displaced by said at least two connected vehicle bodies; and
   a control agent for controlling a constituent of said buoyant fluid.

62. A system according to claim 61 wherein said passageway is made of a material selected from a group consisting of glass, fiber-reinforced plastics, reinforced concrete, steel reinforced concrete and stainless steel.

63. A system according to claim 61 further comprising a buoyant fluid stored in said passageway for providing a buoyancy while displaced by said at least two connected vehicle bodies.

64. A system according to claim 63 wherein said buoyant fluid is one selected from a group consisting of water, sea water, condensed sea water, water with an additive, and sea water with an additive.

65. A system according to claim 61 wherein said control agent controls a specific weight of said buoyant fluid.

66. A system according to claim 61 wherein said control agent is condensed sea water having a specific weight ranging from 12 to 16 $kN/M^3$.

67. A system according to claim 61 wherein said control agent is an additive for increasing said specific weight of said buoyant fluid.

68. A system according to claim 63 wherein said vehicle includes a specific weight detector for detecting said specific weight of said buoyant fluid.

69. A system according to claim 68 wherein said at least two connected vehicle bodies further includes a vessel for storing said control agent for releasing said control agent into said buoyant fluid when said detector detects that said buoyant fluid has a decreased specific weight.

70. A system according to claim 63 wherein said at least two connected vehicle bodies further includes a disturbing device for being optionally operated in said buoyant fluid for disturbing said buoyant fluid.

71. A system according to claim 61 wherein said control agent is a sterilizing agent.

72. A system according to claim 61 wherein said control agent is a fragrant agent.

73. A system according to claim 61 wherein said at least two connected vehicle bodies assumes a shape of a flying boat.

74. A system according to claim 61 wherein said at least two connected vehicle bodies is an air-cushioning boat.

75. A system according to claim 61 wherein said at least two connected vehicle bodies assumes a shape of a railroad car.

76. A system according to claim 75 wherein said at least two connected vehicle bodies includes a plurality of said railroad cars.

77. A system according to claim 76 wherein at least one of said railroad cars carries freight.

78. A system according to claim 77 wherein said railroad cars carry containers.

79. A system according to claim 61 wherein said at least two connected vehicle bodies further includes a bearing mounting for mounting thereon a bearing array for guiding said vehicle to move in said passageway.

80. A system according to claim 79 wherein said passageway further includes a bearing contact band for contact with said bearing array.

81. A system according to claim 80 wherein said contact band is obtained by finishing either one of said inner side walls of said passageway.

82. A system according to claim 80 wherein said contact band is a contact piece secured to either one of said inner side walls of said passageway.

83. A system according to claim 66 wherein said vehicle further includes a rudder device for controlling said vehicle to move along said moving direction.

84. A system according to claim 83 further comprising a buoyant fluid stored in said passageway for generating a buoyancy while displaced by said vehicle wherein said rudder device includes a rudder protruded into said buoyant fluid.

85. A system according to claim 84 wherein said at least two connected vehicle bodies further includes a propeller.

86. A system according to claim 61 wherein said at least two connected vehicle bodies is made of fiber reinforced plastics.

87. A system according to claim 86 wherein said at least two connected vehicle bodies has a hollow housing in which supplemental buoyant gas is stored.

88. A system according to claim 87 wherein said supplemental buoyant gas is on of helium and hydrogen.

89. A system according to claim 61 further comprising a buoyant fluid stored in said passageway for generating a buoyancy while displaced by said vehicle said at least two connected vehicle bodies includes a control room provided with a propeller control switch, a broadcast system control switch, an air-conditioning control switch, a gate control switch, a control agent control switch, a control switch controlling measurement of a specific weight of said buoyant fluid, a disturbing device control switch and a rudder device control switch.

90. A system according to claim 61 wherein said at least two connected vehicle bodies further includes a gate formed into a collapsible passage.

91. A system according to claim 61, further comprising a station provided with a platform having one side thereof, which is parallel to said passageway, provided with a confining member for isolating said passageway.

92. A system according to claim 91 wherein said station has a sliding door for passing freight/passenger through said confining member into/from said at least two connected vehicle bodies.

93. A system according to claim 92 wherein said confining member is in a form o a balustrade.

94. A system according to claim 92 wherein said passageway has a greater depth adjacent said station.

95. A traffic system for conveying freight/passengers comprising:
a passageway defining a moving direction;
a buoyant fluid contained in said passageway for generating a buoyancy while displaced;
at least two connected vehicle bodies arranged to move in said passageway along said moving direction with said buoyancy from said buoyant fluid; and
a bearing mounting mounted on said at least two connected vehicle bodies for mounting thereon a bearing array for guiding said vehicle to move in said passageway.

96. A system according to claim 95, wherein said passageway further includes a bearing contact band for contacting with said bearing array.

97. A system according to claim 96, wherein said contact band is obtained by finishing either one of said inner side walls of said passageway.

98. A traffic system for conveying freight/passengers comprising:
a passageway defining a moving direction;
a buoyant fluid contained in said passageway for generating a buoyancy while displaced; and
at least two connected vehicle bodies arranged to move in said passageway along said moving direction with said buoyancy from said buoyant fluid, wherein said at least two connected vehicle bodies have a hollow housing in which a supplemental buoyant gas selected from one of helium and hydrogen is stored.

99. A traffic method for conveying freight/passengers comprising steps of:
providing at least two connected vehicle bodies;
providing a medium for carrying thereon said at least two connected vehicle bodies moving therealong;
providing a buoyant medium for reducing a weight of said vehicle; and
detecting a specific weight of said buoyant medium.

100. A traffic method for conveying freight/passengers comprising steps of:
- providing at least two connected vehicle bodies;
- providing a medium for carrying thereon said at least two connected vehicle bodies moving therealong;
- providing a buoyant medium for reducing a weight of said vehicle; and
- guiding said at least two connected vehicle bodies to move in said carrying medium by a bearing mounting for mounting thereon a bearing array.

101. A method according to claim 100, wherein said carrying medium further includes a bearing contact band for contacting with said bearing array.

102. A traffic system for conveying freight/passengers comprising:
- a passageway having two inner side walls and an inner bottom wall and defining a moving direction wherein said inner bottom wall has a transverse cross-section formed into a continuous smooth surface; and
- at least two connected vehicle bodies contained in said passageway and running along said moving direction,
- wherein said at least two connected vehicle bodies further include a bearing mounting for mounting thereon a bearing array for guiding said vehicle to move in said passageway.

103. A traffic system for conveying freight/passengers comprising:
- a passageway having two inner side walls and an inner bottom wall and defining a moving direction wherein said inner bottom wall has a transverse cross-section formed into a continuous smooth surface; and
- at least two connected vehicle bodies contained in said passageway and running along said moving direction,
- wherein said at least two connected vehicle bodies have a hollow housing in which a supplemental buoyant gas selected from one of helium and hydrogen is stored.

* * * * *